United States Patent
Ballantine et al.

(10) Patent No.: US 7,326,481 B2
(45) Date of Patent: *Feb. 5, 2008

(54) FUEL CELL SYSTEM

(75) Inventors: Arne W. Ballantine, Round Lake, NY (US); Scott K. Lobdell, Clifton Park, NY (US); Sean S. Lyons, Berne, NY (US)

(73) Assignee: Plug Power Inc., Latham, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/287,715

(22) Filed: Nov. 28, 2005

(65) Prior Publication Data

US 2006/0073364 A1 Apr. 6, 2006

Related U.S. Application Data

(62) Division of application No. 10/232,293, filed on Aug. 30, 2002, now Pat. No. 6,979,506.

(60) Provisional application No. 60/316,499, filed on Aug. 31, 2001.

(51) Int. Cl.
  *H01M 8/00* (2006.01)
  *H01M 8/04* (2006.01)
  *H01M 10/44* (2006.01)
  *H01M 10/48* (2006.01)

(52) U.S. Cl. ............ 429/13; 429/17; 429/50; 429/90

(58) Field of Classification Search ............ None
See application file for complete search history.

(56) References Cited

U.S. PATENT DOCUMENTS

| | | | |
|---|---|---|---|
| 4,769,297 A | 9/1988 | Reiser et al. | 429/17 |
| 4,963,443 A | 10/1990 | Kamoshita | 429/17 |
| 5,316,643 A | 5/1994 | Ahn et al. | 204/265 |
| 5,366,818 A | 11/1994 | Wilkinson et al. | 429/13 |
| 5,543,238 A | 8/1996 | Strasser | 429/17 |
| 5,935,726 A | 8/1999 | Chow et al. | 429/13 |
| 6,096,449 A * | 8/2000 | Fuglevand et al. | 429/13 |
| 6,299,996 B1 | 10/2001 | White et al. | 429/22 |
| 6,322,914 B1 | 11/2001 | Chow et al. | 429/13 |

(Continued)

OTHER PUBLICATIONS

U.S. Appl. No. 11/287,686 entitled, "Fuel Cell System," filed on Nov. 28, 2005.

*Primary Examiner*—Jonathan Crepeau
*Assistant Examiner*—Robert Hodge
(74) *Attorney, Agent, or Firm*—Trop, Pruner & Hu, P.C.

(57) ABSTRACT

The invention provides a reactant delivery system for a dead-headed PEM fuel cell system, comprising a fuel cell, a fuel supply, a purge valve, an inlet orifice, an outlet orifice, and a controller. A first fuel flow circuit is provided, wherein fuel is flowed from the fuel supply to the inlet orifice, through the fuel cell from the inlet orifice, and through the outlet orifice from the fuel cell to the purge valve. A second fuel flow circuit is also provided, wherein fuel is flowed from the fuel supply to the outlet orifice, through the fuel cell from the outlet orifice, and through the inlet orifice from the fuel cell to the purge valve. A valve means is coupled to the controller and adapted to transfer fuel flow between the first flow circuit and the second flow circuit.

12 Claims, 4 Drawing Sheets

U.S. PATENT DOCUMENTS

| | | | |
|---|---|---|---|
| 6,541,141 B1 * | 4/2003 | Frank et al. | 429/17 |
| 6,569,549 B1 | 5/2003 | Sawyer | 429/13 |
| 6,589,678 B1 * | 7/2003 | McElroy | 429/13 |
| 6,660,416 B2 | 12/2003 | Sederquist et al. | 429/19 |
| 6,787,257 B2 | 9/2004 | James et al. | 429/13 |
| 6,893,755 B2 | 5/2005 | Leboe | 429/17 |
| 2002/0094469 A1 | 7/2002 | Yoshizumi et al. | 429/34 |
| 2003/0022041 A1 | 1/2003 | Barton et al. | 429/23 |

* cited by examiner

FUEL CELL SYSTEM

CROSS REFERENCE TO RELATED APPLICATIONS

This application is a divisional of U.S. patent application Ser. No. 10/232,293, entitled "FUEL CELL SYSTEM," filed on Aug. 30, 2002 now U.S. Pat. No. 6,979,506; which claims priority under 35 USC 119(e) from U.S. Provisional Application No. 60/316,499, entitled "FUEL CELL SYSTEM," filed Aug. 31, 2001.

BACKGROUND

The invention generally relates to a fuel cell system that provides improved performance and an increased system lifetime.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

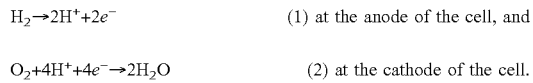

$H_2 \rightarrow 2H^+ + 2e^-$            (1) at the anode of the cell, and $O_2 + 4H^+ + 4e^- \rightarrow 2H_2O$            (2) at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDL's generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include Nafion™, Gore Select™, sulphonated fluorocarbon polymers, and other materials such as polybenzimidazole and polyether ether ketone. Various suitable catalyst formulations are also known in the art, and are generally platinum-based.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

There is a continuing need for design improvements to improve the efficiency and performance of such systems.

SUMMARY

The invention provides a reactant delivery system and associated methods of operation for dead-headed PEM fuel cell systems. In one aspect, the invention provides a reactant delivery system wherein a fuel cell has a first orifice and a second orifice. The first and second orifices are in fluid communication such that a reactant can pass between them through the fuel cell. A fuel supply, such as a pressure vessel or conduit containing hydrogen, is coupled to the first orifice along a first conduit. The first conduit has a first valve adapted to regulate flow between the first conduit and the fuel cell. The first conduit is coupled to a second conduit at a location between the fuel supply and the first valve. The first conduit is coupled to a third conduit at a location between the first valve and the fuel cell. A purge valve is coupled to the second orifice along a fourth conduit. The fourth conduit has a fourth valve adapted to regulate flow between the fourth conduit and the fuel cell. The fourth conduit is coupled to the second conduit at a location between the fuel cell and the fourth valve. The fourth conduit is coupled to the third conduit at a location between the fourth valve and the purge valve. The second conduit has a second valve adapted to regulate flow between the first conduit and the fourth conduit. The third conduit has a third valve adapted to regulate flow between the first conduit and the fourth conduit.

Systems under the present invention can include various additional features as discussed herein, either alone or in combination. In some embodiments, the second conduit can further include a first check valve adapted to prevent flow from the fourth conduit to the first conduit. Similarly, the third conduit can further include a second check valve adapted to prevent flow from the fourth conduit to the first conduit.

In some embodiments, the system can further include a controller coupled to the first, second, third and fourth valves. As an example, the controller can have a first mode of operation wherein the controller opens the first and fourth valves and closes the second and third valves. In a second mode of operation, the controller closes the first and fourth valves and opens the second and third valves. The system thus reverses the direction of reactant flow through the fuel cell.

The controller can be adapted to alternate between the first and second operating modes at successive time intervals of a predetermined size. As an example, the controller can be adapted to monitor a performance parameter of the fuel cell, and be configured to alternate between the first and second operating modes (e.g., reverse reactant flow) when the performance parameter falls below a predetermined level. As an example, in some embodiments, the performance parameter can be a voltage of the fuel cell, such that the controller alternate between the first and second operating modes when the voltage falls below 0.4 volts.

In some embodiments, the system may include a third mode of operation wherein the controller is adapted to open the purge valve for a predetermined period of time (e.g., to purge inert components accumulated in the anode chamber of the fuel cell as it is operated in dead-headed mode). As an example, the controller can be adapted to operate in the third operating mode as an intermediate step to alternating between the first and second operating modes.

In another aspect, the invention provides a reactant delivery system for a dead-headed PEM fuel cell system, comprising a fuel cell, a fuel supply, a purge valve, an inlet orifice, an outlet orifice, and a controller. A first fuel flow circuit is provided, wherein fuel is flowed from the fuel supply to the inlet orifice, through the fuel cell from the inlet orifice, and through the outlet orifice from the fuel cell to the purge valve. A second fuel flow circuit is also provided, wherein fuel is flowed from the fuel supply to the outlet orifice, through the fuel cell from the outlet orifice, and through the inlet orifice from the fuel cell to the purge valve. A valve means is coupled to the controller and adapted to transfer fuel flow between the first flow circuit and the second flow circuit.

In some embodiments, the valve means comprises a first valve, a second valve, a third valve and a fourth valve, wherein the first valve regulates flow from the fuel supply to the first flow circuit, wherein the second valve regulates flow from the fuel supply to the second flow circuit, wherein the third valve regulates flow from the second circuit to the purge valve, and wherein the fourth valve regulates flow from the first circuit to the purge valve.

In some embodiments, the second flow circuit intersects the first flow circuit at a location on the first flow circuit between the fourth valve and the purge valve. A first check valve is provided in the second circuit at a location between the third valve and the intersection of the first and second flow circuits, the first check valve being adapted to prevent flow from the first flow circuit to the third valve. A second check valve is provided in the first circuit at a location between the second valve and the intersection of the first and second flow circuits, the second check valve being adapted to prevent flow from the second flow circuit to the second valve.

In some embodiments, the valve means comprises a first three-way valve having a first position directing flow from the fuel supply to the first circuit, and a second position directing flow from the fuel supply to the second circuit. Other valve arrangements are possible.

In another aspect, the invention provides a method of operating a fuel cell system, including at least the following steps: (1) coupling a hydrogen supply to an inlet of a dead-headed fuel cell; (2) pressurizing the fuel cell inlet with hydrogen from the hydrogen supply; (3) reacting at least a portion of the hydrogen in the fuel cell to supply electrical current to a load; (4) opening an outlet of the fuel cell to allow hydrogen to flow through the fuel cell; (5) removing the hydrogen supply from the inlet of the fuel cell and closing the inlet of the fuel cell; (6) coupling the hydrogen supply to the outlet of the fuel cell; (7) pressurizing the fuel cell outlet with hydrogen from the hydrogen supply; (8) reacting at least a portion of the hydrogen in the fuel cell to supply electrical current to the load; and (9) opening the inlet of the fuel cell to allow hydrogen to flow through the fuel cell.

In some embodiments, an additional step may include alternating at successive time intervals of a predetermined size the steps of coupling the hydrogen supply to the inlet of the fuel cell and coupling the hydrogen supply to the inlet of the fuel cell. For example, the system can be configured to periodically purge itself and reverse the directions that hydrogen is fed to the fuel cell.

Various embodiments may include the additional steps: (1) monitoring a performance parameter of the fuel cell; and (2) performing the step of coupling the hydrogen supply to the outlet of the fuel cell when the performance parameter falls below a predetermined level.

In some embodiments, the purging steps can each include purging the fuel cell for a predetermined period of time. As an additional feature, methods under the invention may include: (1) coupling a battery to the load to supply power to the load during the step of opening an outlet of the fuel cell; and (2) coupling the battery to the load to supply power to the load during the step of opening the inlet of the fuel cell.

In another aspect, the invention provides a method of operating a fuel cell system, including the following steps: (1) pressurizing a dead-headed fuel cell with hydrogen by coupling a first orifice of the fuel cell to a hydrogen supply, the fuel cell having a second orifice in a closed position; (2) reacting at least a portion of the hydrogen in the fuel cell to supply electrical current to a load; (3) closing the first orifice and opening the second orifice; (4) pressurizing the fuel cell with hydrogen by coupling the second orifice of the fuel cell to the hydrogen supply; and (5) reacting at least a portion of the hydrogen in the fuel cell to supply electrical current to the load. Some embodiments may include purging the fuel cell prior to the step of pressurizing the fuel cell.

In another aspect, the invention provides a method of operating a fuel cell system, including the following steps: (1) dead-heading an anode chamber of a fuel cell; (2) flowing hydrogen into a first orifice of the anode chamber; (3) reacting at least a portion of the hydrogen in the anode chamber to supply electrical current to a load; (4) flowing hydrogen into a second orifice of the anode chamber; and (5) reacting at least a portion of the hydrogen in the anode chamber to supply electrical current to the load.

DETAILED DESCRIPTION

A simplified fuel cell system is contemplated which utilizes a substantially pure anode reactant (hydrogen) and either air or a substantially pure cathode reactant (oxygen). In some cases the stack of such a fuel cell system may be "dead headed" to contain all of the hydrogen (and/or the oxidant) within the stack until a sufficient amount has been reacted. Periodically the dead headed stack may be vented or purged. Hydrogen and/or oxidant that have not been reacted in the fuel cell stack may be vented to the atmosphere or re-circulated through the stack (purged), and in some cases may be oxidized before it is vented. In a dead headed system a tank may be provided which contains dry or sub-saturated hydrogen for use within the fuel cell assembly. Such sub-saturated reactants may dry out the leading edge of the membrane and in turn lead to premature membrane decay.

Operation of a dead headed hydrogen fuel cell has typically occurred as follows: Hydrogen is input to the stack at the anode inlet. The anode outlet is dead-ended with a purge valve. During operation, hydrogen enters the anode side of the fuel cell, passes through the membrane as load is applied, and reacts with oxygen on the cathode side, forming water. Some amount of water may back diffuse from the cathode side to the anode side. Nitrogen may also diffuse to the anode side. Factors such as the increased amount of nitrogen and water diffusion eventually cause cell performance to drop, and when this occurs a purge valve is triggered to open and close.

Figure 1:
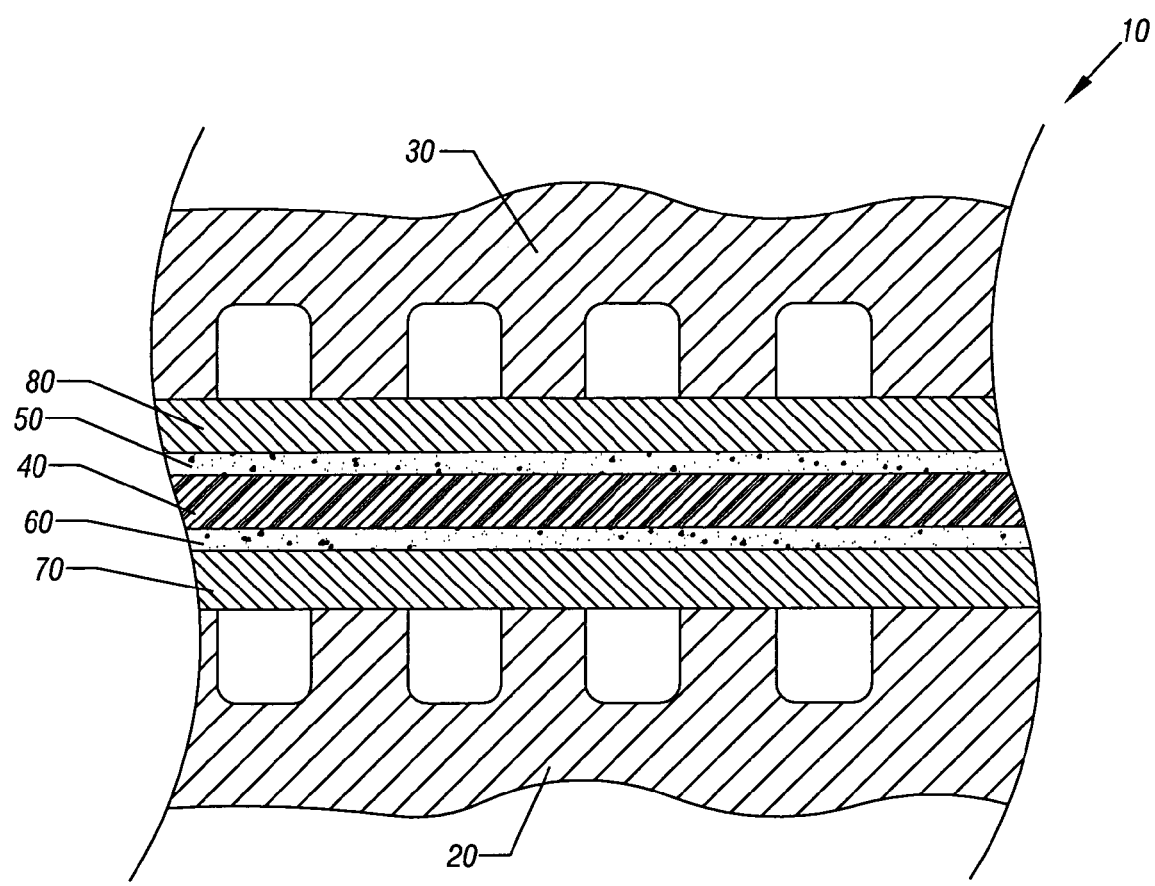
FIG. 1 is a cross-sectional view of an embodiment of a fuel cell.

FIG. 1 shows an embodiment of a PEM fuel cell 10 including flow field plates 20 and 30, a PEM 40, catalysts 50 and 60 and gas diffusion layers 70 and 80. It will be appreciated by those skilled in the art that the invention can be practiced with a single fuel cell or a plurality of fuel cells arranged in a fuel cell stack.

Figure 2:
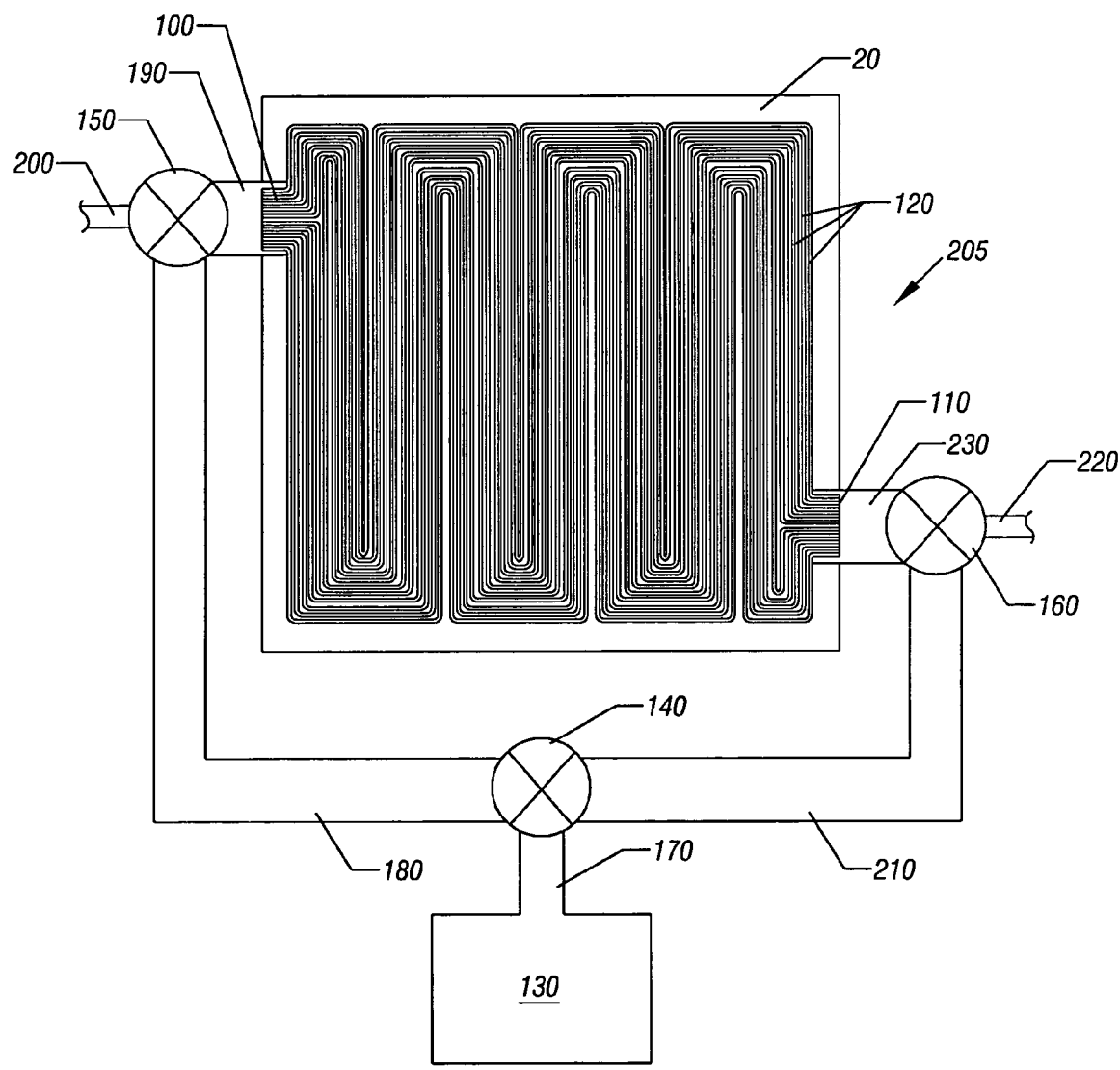
FIG. 2 is a block diagram of an embodiment of a system including a fuel cell.

FIG. 2 shows a system 205 including flow field plate 20 of fuel cell 10. Flow field plate 20 has regions 100 and 110, and open faced channels 120 that define a flow path for reactant gas (e.g., oxidant gas, such as air or oxygen, or fuel gas, such as hydrogen or hydrocarbon) between regions 100 and 110. Flow field plate 20 is fluidly connected to a reactant gas source 130, devices (e.g., valves) 140, 150 and 160, and tubes 170, 180, 190, 200, 210, 220 and 230. Each of devices 140, 150 and 160 has at least two positions which allow a gas to flow through system 205 along different paths so that system 205 has at least two operational states.

In one operational state, devices 140, 150 and 160 are positioned so that the reactant gas flows from source 130 to region 100 along tubes 170, 180 and 190. The gas flows from region 100 to region 110 via channels 120. The gas exits flow field plate 20 at region 110 along tubes 220 and 230. In this operational state, gas does not flow from between tubes 190 and 200, since valve 150 diverts flow from tube 180 to tube 190. Valve 140 is configured such that gas also does not flow between tubes 210 and 170. Valve 160 is configured such that gas does not flow between tubes 210 and 220, or between tubes 210 and 230.

In a different operational state, devices 140, 150 and 160 are configured so that the reactant gas flows from source 130 to region 110 (instead of region 100 in the first operational state) along tubes 170, 210 and 230. The gas flows from region 110 to region 100 via channels 120. The gas exits flow field plate 20 at region 100 along tubes 190 and 200. In this operational state, gas does not flow from between tubes 220 and 230. Gas also does not flow between tubes 180 and 170, between tubes 180 and 190, or between tubes 180 and 200.

Switching the operational state of system 205 has the effect of reversing the flow of the reactant gas through flow field plate 20. The operational state can be switched during the purge cycle of fuel cell system operation. Generally, the operational state is switched while reactant gas is not flowing through flow field plate 20. In one example, reactant gas can flow through flow field plate 20 (e.g., so that the fuel cell produces a non-zero power output) for a desired period of time. The flow of reactant gas is then stopped (e.g., so that the fuel cell produces a power output of about zero), and the operational state of system 205 is changed. The desired period of time can be based, for example, on a purge cycle of the fuel cell, which can be measured manually and/or automatically. In general, the operational state of system 205 can be switched manually and/or automatically.

Figure 3:
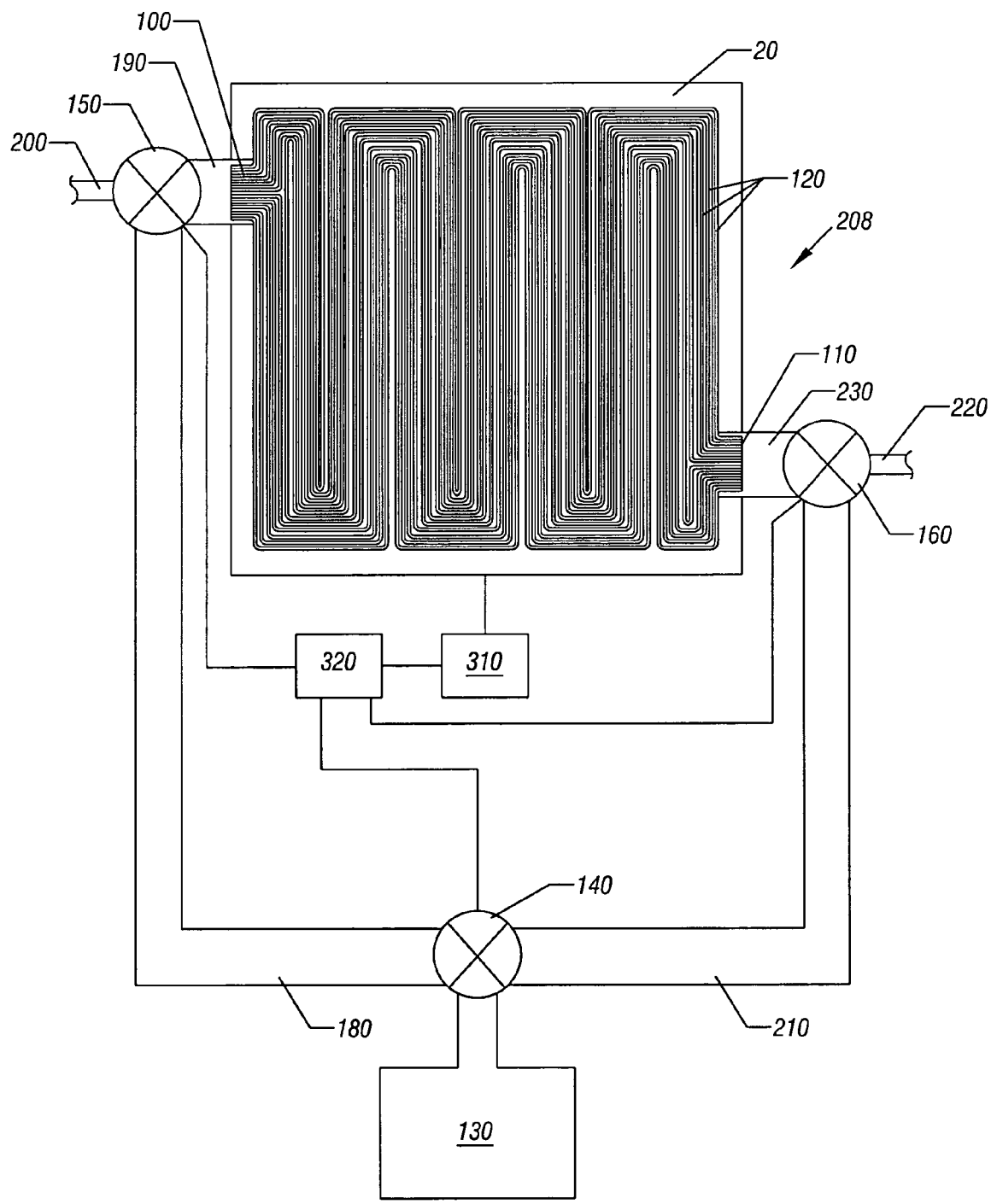
FIG. 3 is a block diagram of an embodiment of a system including a fuel cell.

FIG. 3 shows a system 208 designed so that its operational states can be automatically switched. System 208 includes a monitor 310 that measures one or more performance characteristics of system 208. Such performance characteristics are known to those skilled in the art and include, for example, power output, voltage or the amount of the time that the fuel cell has been operating. Other performance characteristics may also be monitored. When the measured parameter(s) fall below some predetermined value (e.g., a cell voltage falls below 0.4 volts), monitor 310 sends a signal to a controller 320. Controller 320 begins a purge cycle of fuel cell system 208 by changing the positions of devices 140, 150 and 160. This changes the operational state of fuel cell 10 by reversing the flow of gas through flow field plate 20. This evacuates the fuel cell stack of residual reactant gases and inerts. Typically, controller 320 stops the flow of gas through flow field plate (e.g., by closing device 140) so that the power output of fuel cell 10 drops to zero. Then, controller 320 switches the positions of devices 140, 150 and 160 to reverse gas flow through flow field plate 20.

System 208 can also be designed so that the operational state of system 208 is manually changed. For example, monitor 310 can be designed to provide a read-out that can be read by a maintenance technician. Depending upon the read-out of monitor 310, the technician can manually change the positions of devices 140, 150 and 160 to change the operational state of system 208. In some embodiments, system 208 is designed so that the operational state of system 208 can be changed both manually and automatically.

In other embodiments, the operational state of systems 205 and 208 can be reversed as follows. Devices 140, 150 and 160 are positioned so that gas does not flow through the system (e.g., devices 140, 150 and 160 are closed). Tubes 190 and 230 are disconnected from devices 150 and 160, respectively. Flow field plate 20 is then rotated (e.g., rotated 180°), and tubes 190 and 230 are connected to devices 160 and 150, respectively. Typically, rotating flow field plate 20 involves rotating fuel cell 10. In certain embodiments, however, flow field plate 20 can be rotated without rotating other components of fuel cell 10.

Figure 4:
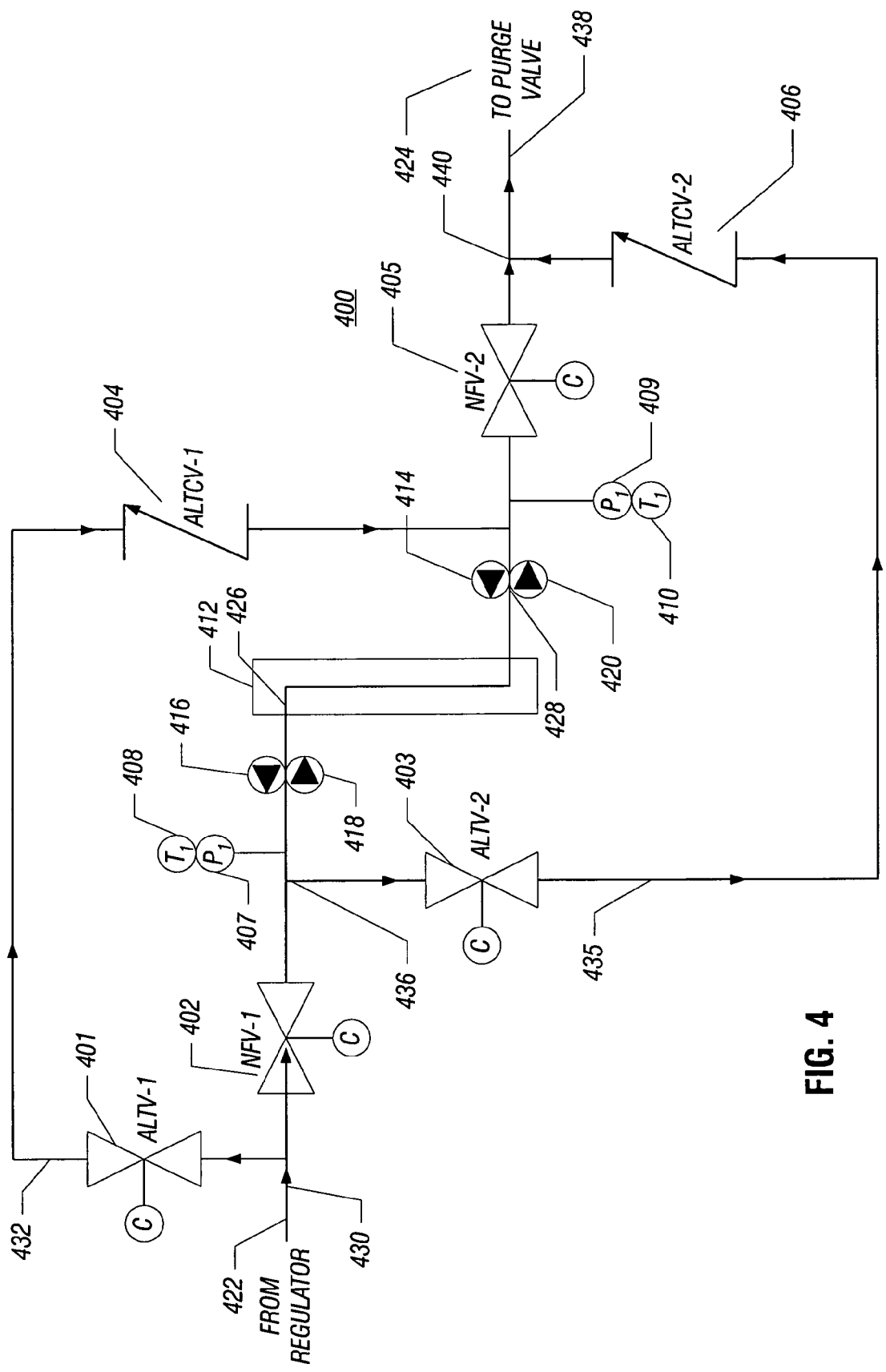
FIG. 4 is a schematic diagram of an embodiment of a dead headed fuel cell system.

FIG. 4 illustrates, in schematic format, a dead headed hydrogen fuel cell system 400 having the ability to periodically alternate the direction of reactant flows through fuel cell stack 412. For simplicity, the oxidant gas circuit of system 400 is not shown. In normal operating mode the certain indicated valves are opened while others remain closed. When it is determined that the fuel cell system requires a purging of the reactants, the alternated valve conditions are triggered. This reverses flow of the reactant gases while simultaneously conducting a purge.

The operational states of the system of FIG. 4 are summarized in Table 1:

TABLE 1

| State B (NFV-1 & NFV-2 Open) | State A (NFV-1 & NFV-2 Closed) |
|---|---|
| 401 - ALTV-1 CLOSED | 401 - ALTV-1 OPEN |
| 402 - NFV-1 OPEN | 402 - NFV-1 CLOSED |
| 403 - ALTV-2 CLOSED | 403 - ALTV-2 OPEN |
| 404 - ALTCV-1 CV BLOCKING | 404 - ALTCV-1 CV FLOWING |
| 405 - NFV-2 OPEN | 405 - NFV-2 CLOSED |
| 406 - ALTCV-2 CV BLOCKING | 406 - ALTCV-2 CV FLOWING |
| 407 - P1 INLET PRESSURE | 407 - P1 OUTLET PRESSURE |
| 408 - T1 INLET TEMPERATURE | 408 - T1 OUTLET TEMPERATURE |
| 409 - P1 OUTLET PRESSURE | 409 - P1 INLET PRESSURE |
| 410 - T1 OUTLET TEMPERATURE | 410 - T1 INLET TEMPERATURE |

The direction of flow through fuel cell stack 412 in state A is indicated by inlet arrow 414 and outlet arrow 416. The direction of flow through fuel cell stack 412 in state B is indicated by inlet flow direction arrow 418 and outlet flow direction arrow 420. The fuel gas enters the system 400 through conduit 422 (e.g., connected to a pressure regulator on a hydrogen tank). As an example, in operating state B, valves 401 and 403 are closed and valve 402 is open, such that the fuel gas enters fuel cell stack 412 as indicated by arrow 418. Temperature and pressure indicators 407 and 408 measure the inlet temperature and pressure conditions. While valve 405 is open in this state, the system is dead-headed since a purge valve (not shown) on outlet conduit 424 is closed. Temperature and pressure indicators 409 and 410 measure the temperature and pressure conditions at the outlet of fuel cell stack 412.

When the system is switched to operating state A, as indicated in Table 1, valve 402 is closed and valve 401 is opened, such that the fuel gas flows through one-way valve 404 and into stack 412 as shown by flow direction arrows 414 and 416. In this mode, valve 403 is opened to allow the gas to be purged through one-way valve 406 when the purge valve on conduit 424 is opened. Valve 405 is closed to avoid back flow into fuel cell 412.

In alternate terms, the system 400 shown in FIG. 4 can be described as a reactant delivery system wherein a fuel cell has a first orifice 426 and a second orifice 428. The first and second orifices 426, 428 are in fluid communication such that a reactant can pass between them through the fuel cell 412. A fuel supply 422, such as a pressure vessel or conduit containing hydrogen, is coupled to the first orifice 426 along a first conduit 430. The first conduit 430 has a first valve 402 adapted to regulate flow between the first conduit 430 and the fuel cell 412. The first conduit 430 is coupled to a second conduit 432 at a location 434 between the fuel supply 422 and the first valve 402. The first conduit 430 is coupled to a third conduit 435 at a location 436 between the first valve 402 and the fuel cell 412. A purge valve 424 is coupled to the second orifice 428 along a fourth conduit 438. The fourth conduit 438 has a fourth valve 405 adapted to regulate flow between the fourth conduit 438 and the fuel cell 412. The fourth conduit 438 is coupled to the second conduit 432 at a location 442 between the fuel cell 412 and the fourth valve 405. The fourth conduit 438 is coupled to the third conduit 435 at a location 440 between the fourth valve 405 and the purge valve 424. The second conduit 432 has a second valve 401 adapted to regulate flow between the first conduit 430 and the fourth conduit 438. The third 435 conduit has a third valve 403 adapted to regulate flow between the first conduit 430 and the fourth conduit 438.

The operation of such systems may also be described as a method. For example, such a method could include the following steps: (1) coupling a hydrogen supply 422 to an inlet 426 of a dead-headed fuel cell 412; (2) pressurizing the fuel cell inlet 426 with hydrogen from the hydrogen supply 422; (3) reacting at least a portion of the hydrogen in the fuel cell 412 to supply electrical current to a load (not shown); (4) opening an outlet 428 of the fuel cell 412 to allow hydrogen to flow through the fuel cell 412; (5) removing the hydrogen supply 422 from the inlet 426 of the fuel cell 412 and closing the inlet 426 of the fuel cell 412; (6) coupling the hydrogen supply 422 to the outlet 428 of the fuel cell 412; (7) pressurizing the fuel cell outlet 428 with hydrogen from the hydrogen supply 422; (8) reacting at least a portion of the hydrogen in the fuel cell 412 to supply electrical current to the load; and (9) opening the inlet 426 of the fuel cell to allow hydrogen to flow through the fuel cell 412. Methods of operation may also be described in other ways, foe example as set forth in the claims, and may include any of the design aspects, features or additional steps discussed herein, either alone or in combination.

As an additional feature of systems such as discussed with respect to FIG. 4, a coolant flow circuit (not shown) can be arranged so that the flow of coolant is concurrent with or counter to the flow of one or more of the reactant gases in the fuel cell. Typically, the flow of coolant is concurrent with the flow of the reactant gases. In some embodiments, the flow of coolant is stopped and reversed during the period of time that the flow of reactant gas is stopped and reversed. Thus, the flow of reactant gas can be reversed without switching the direction of coolant flow relative to the flow direction of the reactant gas.

Furthermore, those skilled in the art will appreciate that devices, such as one or more batteries, can be connected to the fuel cell or fuel cell stack so that, during the time period that the power output of the fuel cell or fuel cell stack is about zero (e.g., when reactant gas flow is stopped), power output from the battery can be used in place of the fuel cell.

While the invention has been disclosed with respect to a limited number of embodiments, those skilled in the art, having the benefit of this disclosure will appreciate numerous modifications and variations therefrom. It is intended that the invention covers all such modifications and variations as fall within the true spirit and scope of the invention.

What is claimed is:

1. A method of operating a fuel cell system, comprising:
   coupling a hydrogen supply to an inlet of a fuel cell, the fuel cell having an outlet;
   pressurizing the fuel cell inlet with hydrogen from the hydrogen supply while the outlet is closed;
   reacting at least a portion of the hydrogen in the fuel cell to supply electrical current to a load while the outlet is closed;
   opening the outlet of the fuel cell to allow hydrogen to flow through the fuel cell from the inlet to the outlet;
   removing the hydrogen supply from the inlet of the fuel cell and closing the inlet of the fuel cell;
   coupling the hydrogen supply to the outlet of the fuel cell;
   pressurizing the fuel cell outlet with hydrogen from the hydrogen supply while the inlet is closed;
   reacting at least a portion of the hydrogen in the fuel cell to supply electrical current to the load while the inlet is closed; and
   opening the inlet of the fuel cell to allow hydrogen to flow through the fuel cell from the outlet to the inlet.

2. The method of claim 1, further comprising:
alternating at successive time intervals of a predetermined size the steps of coupling the hydrogen supply to the inlet of the fuel cell and coupling the hydrogen supply to the outlet of the fuel cell.

3. The method of claim 1, further comprising:
monitoring a performance parameter of the fuel cell; and
performing the step of coupling the hydrogen supply to the outlet of the fuel cell when the performance parameter falls below a predetermined level.

4. The method of claim 3, wherein the performance parameter is a voltage of the fuel cell, and the predetermined threshold is 0.4 volts.

5. The method of claim 1, wherein the act of opening the outlet of the fuel cell includes purging the fuel cell for a predetermined period of time, and wherein the act of opening the inlet of the fuel cell includes purging the fuel cell for a predetermined period of time.

6. The method of claim 1, further comprising:
coupling a battery to the load to supply power to the load during the step of opening an outlet of the fuel cell; and
coupling the battery to the load to supply power to the load during the step of opening the inlet of the fuel cell.

7. The method of claim 1, further comprising:
purging the fuel cell prior to the act of pressurizing the fuel cell inlet.

8. The method of claim 7, further comprising:
monitoring a performance parameter of the fuel cell; and
performing the purging of the fuel cell in response to the performance parameter falling below a predetermined level.

9. The method of claim 1, further comprising:
purging the fuel cell prior to the act of pressurizing the fuel cell outlet.

10. The method of claim 9, further comprising:
monitoring a performance parameter of the fuel cell; and
performing the purging of the fuel cell in response to the performance parameter falling below a predetermined level.

11. A method of operating a fuel cell system comprising a fuel cell having a first orifice and a second orifice, the method comprising:
closing off the second orifice of the fuel cell;
pressurizing the fuel cell with hydrogen while the second orifice is closed by coupling the first orifice of the fuel cell to a hydrogen supply;
reacting at least a portion of the hydrogen in the fuel cell to supply electrical current to a load while the second orifice is closed;
closing the first orifice and opening the second orifice;
pressurizing the fuel cell with hydrogen while the first orifice is closed by coupling the second orifice of the fuel cell to the hydrogen supply; and
reacting at least a portion of the hydrogen in the fuel cell to supply electrical current to the load while the first orifice is closed.

12. A method of operating a fuel cell system, comprising:
closing off an exhaust flow path of an anode chamber of a fuel cell;
flowing hydrogen into a first orifice of the anode chamber while the exhaust flow path is closed off;
reacting at least a portion of the hydrogen in the anode chamber to supply electrical current to a load while the exhaust flow path is closed off;
flowing hydrogen into the exhaust flow path of the anode chamber; and
reacting at least a portion of the hydrogen in the anode chamber to supply electrical current to the load.

* * * * *